United States Patent
Lappeteläinen et al.

(10) Patent No.: US 7,702,325 B2
(45) Date of Patent: Apr. 20, 2010

(54) TERMINAL SYSTEM AND RADIO RESOURCE CONTROL IN WIRELESS TELECOMMUNICATIONS SYSTEM

(75) Inventors: Antti Lappeteläinen, Espoo (FI); Jussi Ojala, Helsinki (FI)

(73) Assignee: Nokia Corporation, Espoo (FI)

(*) Notice: Subject to any disclaimer, the term of this patent is extended or adjusted under 35 U.S.C. 154(b) by 1200 days.

(21) Appl. No.: 10/829,473

(22) Filed: Apr. 22, 2004

(65) Prior Publication Data

US 2005/0202809 A1 Sep. 15, 2005

(30) Foreign Application Priority Data

Mar. 12, 2004 (FI) .................. 20040392

(51) Int. Cl.
H04B 7/26 (2006.01)
H04M 1/66 (2006.01)

(52) U.S. Cl. .................. 455/422.1; 455/41.2; 455/420; 455/553.1

(58) Field of Classification Search ........... 455/502, 455/3.05, 41.2, 41.3, 3.06, 418–420, 437, 455/558–559, 422.1, 557, 550.1, 556.1, 566, 455/436, 553.1; 370/331, 338
See application file for complete search history.

(56) References Cited

U.S. PATENT DOCUMENTS

| | | | | |
|---|---|---|---|---|
| 5,715,522 A * | 2/1998 | Vimpari et al. ............... 455/88 |
| 5,745,850 A * | 4/1998 | Aldermeshian et al. ...... 455/417 |
| 6,023,620 A * | 2/2000 | Hansson ..................... 455/419 |
| 6,134,437 A * | 10/2000 | Karabinis et al. ............ 455/427 |
| 6,615,057 B1 * | 9/2003 | Pettersson ................... 455/558 |
| 6,633,759 B1 * | 10/2003 | Kobayashi ................... 455/419 |
| 6,697,638 B1 * | 2/2004 | Larsson et al. ............ 455/553.1 |
| 6,842,613 B2 * | 1/2005 | Mittal ......................... 455/419 |
| 6,868,282 B2 * | 3/2005 | Carlsson ..................... 455/558 |
| 6,975,858 B2 * | 12/2005 | Cao et al. .................... 455/420 |
| 7,010,268 B2 * | 3/2006 | Chen ........................ 455/41.2 |
| 7,092,671 B2 * | 8/2006 | Lunsford et al. ........... 455/41.2 |
| 2001/0009845 A1 * | 7/2001 | Feuchtinger et al. ....... 455/3.05 |
| 2001/0052858 A1 * | 12/2001 | Vincent et al. ......... 340/825.69 |
| 2002/0085511 A1 * | 7/2002 | Koponen et al. ............ 370/315 |
| 2002/0136174 A1 * | 9/2002 | Gleeson ..................... 370/329 |
| 2003/0003892 A1 * | 1/2003 | Makinen .................... 455/345 |
| 2003/0003900 A1 * | 1/2003 | Goss et al. .................. 455/417 |
| 2003/0008612 A1 * | 1/2003 | Andreason ................. 455/11.1 |
| 2003/0191807 A1 * | 10/2003 | Olson ......................... 709/206 |
| 2004/0058678 A1 * | 3/2004 | deTorbal ..................... 455/437 |
| 2004/0142684 A1 * | 7/2004 | Ratert et al. ................ 455/420 |
| 2004/0204151 A1 * | 10/2004 | Muthuswamy et al. ...... 455/567 |
| 2004/0266348 A1 | 12/2004 | Deshpande et al. |
| 2006/0046750 A1 * | 3/2006 | Deschenes .................. 455/462 |

FOREIGN PATENT DOCUMENTS

DE 43 10 230 A1 6/1994
GB 2365699 A * 2/2002

* cited by examiner

*Primary Examiner*—George Eng
*Assistant Examiner*—Brandon J Miller
(74) *Attorney, Agent, or Firm*—Harrington & Smith

(57) ABSTRACT

A subscriber terminal holding a subscriber identity is connected to a sub-terminal using the identity of the subscriber terminal over a wireless proximity interface. A radio link directed from an infrastructure to the sub-terminal is requested by the subscriber terminal, and at least a portion of signalling between the sub-terminal and the wireless telecommunications infrastructure is routed via the subscriber terminal.

26 Claims, 6 Drawing Sheets

TERMINAL SYSTEM AND RADIO RESOURCE CONTROL IN WIRELESS TELECOMMUNICATIONS SYSTEM

FIELD

The invention relates to a method of communicating in a wireless tele-communications system, a terminal system in a wireless telecommunications system, a subscriber terminal in a wireless telecommunications system, a sub-terminal in a wireless telecommunications system, and a radio resource control system in a wireless telecommunications system.

BACKGROUND

As the information transfer capacity in digital wireless communications has increased dramatically and a great variety of digital services have become available to end users, user interface elements, such as audiovisual devices, integrated into mobile terminals may turn out to be insufficient or user unfriendly.

One solution to improve the usability of services is to equip mobile terminals with an extended user interface designed according to a user's specific needs. A mobile terminal with an extended user interface establishes an independent connection based on its subscriber identity to the wireless telecommunications network, and the user may request a required service to the mobile terminal with the extended user interface from another mobile terminal.

The independent connection, however, involves signalling between the network infrastructure and the mobile terminal equipped with the extended user interface and, which signalling requires radio resources. Therefore, it is desirable to consider alternative techniques to extend the mobile terminal capabilities.

BRIEF DESCRIPTION OF THE INVENTION

An object of the invention is to provide an improved method, terminal system, subscriber terminal, sub-terminal, and radio resource control system.

According to a first aspect of the invention, there is provided a method of communicating in a wireless telecommunications system including a subscriber terminal and an infrastructure, the method including: connecting the subscriber terminal to the infrastructure over a wireless interface, the subscriber terminal holding a subscriber identity in the wireless telecommunications system; connecting the subscriber terminal to at least one sub-terminal over a proximity wireless interface, the at least one sub-terminal using the subscriber identity of the subscriber terminal; requesting a radio link from the subscriber terminal, the radio link being directed from the infrastructure to the at least one sub-terminal; generating signalling parameters for controlling the radio link; and communicating at least one of the signalling parameters between the sub-terminal and the infrastructure via the subscriber terminal.

According to a second aspect of the invention, there is provided a terminal system of a wireless telecommunications system, the terminal system including an infrastructure and a subscriber terminal, the subscriber terminal including: connecting means for connecting the subscriber terminal to the infrastructure; and subscriber identity means for holding the subscriber identity of the subscriber terminal in the wireless telecommunications system, the terminal system further including: at least one sub-terminal using the subscriber identity of the subscriber terminal and including receiving means for providing a radio link directed from the infrastructure to the at least one sub-terminal, the radio link being controlled on the basis of signalling parameters; requesting means, in the subscriber terminal, connected to the connecting means, for requesting the radio link; signalling means connected to the connecting means, for communicating at least one of the signalling parameters between the subscriber terminal and the infrastructure; and proximity signalling means connected to the signalling means, for communicating the at least one of the signalling parameters between the subscriber terminal and the at least one sub-terminal over a proximity wireless interface.

According to a third aspect of the invention, there is provided a subscriber terminal of a wireless telecommunications system including an infrastructure, the subscriber terminal including: connecting means for connecting the subscriber terminal to the infrastructure; and subscriber identity means for holding the subscriber identity of the subscriber terminal in the wireless telecommunications system; requesting means connected to the connecting means, for requesting a radio link directed from the infrastructure to at least one sub-terminal, the at least one sub-terminal using the subscriber identity of the subscriber terminal, the radio link being controlled on the basis of signalling parameters; proximity signalling means for communicating at least one of the signalling parameters with the at least one sub-terminal over a proximity wireless interface; and signalling means connected to the connecting means and the proximity signalling means, for communicating at least one of the signalling parameters between the subscriber terminal and the infrastructure.

According to a fourth aspect of the invention, there is provided a sub-terminal of a wireless telecommunications system including an infrastructure and a subscriber terminal connected to the infrastructure and holding a subscriber identity in the wireless telecommunications system, the sub-terminal using the subscriber identity of the subscriber terminal, the sub-terminal including: receiving means for providing a radio link directed from the infrastructure to the sub-terminal, the radio link being controlled on the basis of signalling parameters communicated between the subscriber terminal and the infrastructure, the radio link being requested by the subscriber terminal; and proximity signalling means for communicating at least some of the signalling parameters between the subscriber terminal and the sub-terminal over a proximity wireless interface.

According to a fifth aspect of the invention, there is provided a radio resource control system for controlling radio resources in a wireless telecommunications system including an infrastructure and a subscriber terminal connected to the infrastructure, the subscriber terminal holding the subscriber identity in the wireless telecommunications system, the radio resource control system including: access control means for controlling the access of at least one sub-terminal to the infrastructure on the basis of an access request from the subscriber terminal, the at least one sub-terminal using the subscriber identity of the subscriber terminal; controlling means connected to the access control means, for controlling a radio link directed from the infrastructure to at least one sub-terminal, the radio link being controlled on the basis of signalling parameters; and signalling means for communicating at least one of the signalling parameters between the infrastructure and the subscriber terminal, the at least one of the signalling parameters being communicated between the subscriber terminal and the at least one sub-terminal over a proximity wireless interface. Preferred embodiments of the invention are described in the dependent claims.

The method and system of the invention provide several advantages. In a preferred embodiment of the invention, the invention extends the mobile terminal capabilities by means of a sub-terminal which does not require a subscriber identity in the network. The signalling between the sub-terminal and the infrastructure is at least partially routed via the subscriber terminal, thus releasing radio resources for data transfer. Furthermore, the invention enables the sub-terminal to be used without a transmitter in the sub-terminal, thus simplifying the structure of the sub-terminal and reducing costs of manufacture.

LIST OF DRAWINGS

In the following, the invention will be described in greater detail with reference to the preferred embodiments and the accompanying drawings, in which FIG. 1 shows an example of a terminal system and a radio resource control system according to embodiments of the invention;

DESCRIPTION OF EMBODIMENTS

Figure 1:
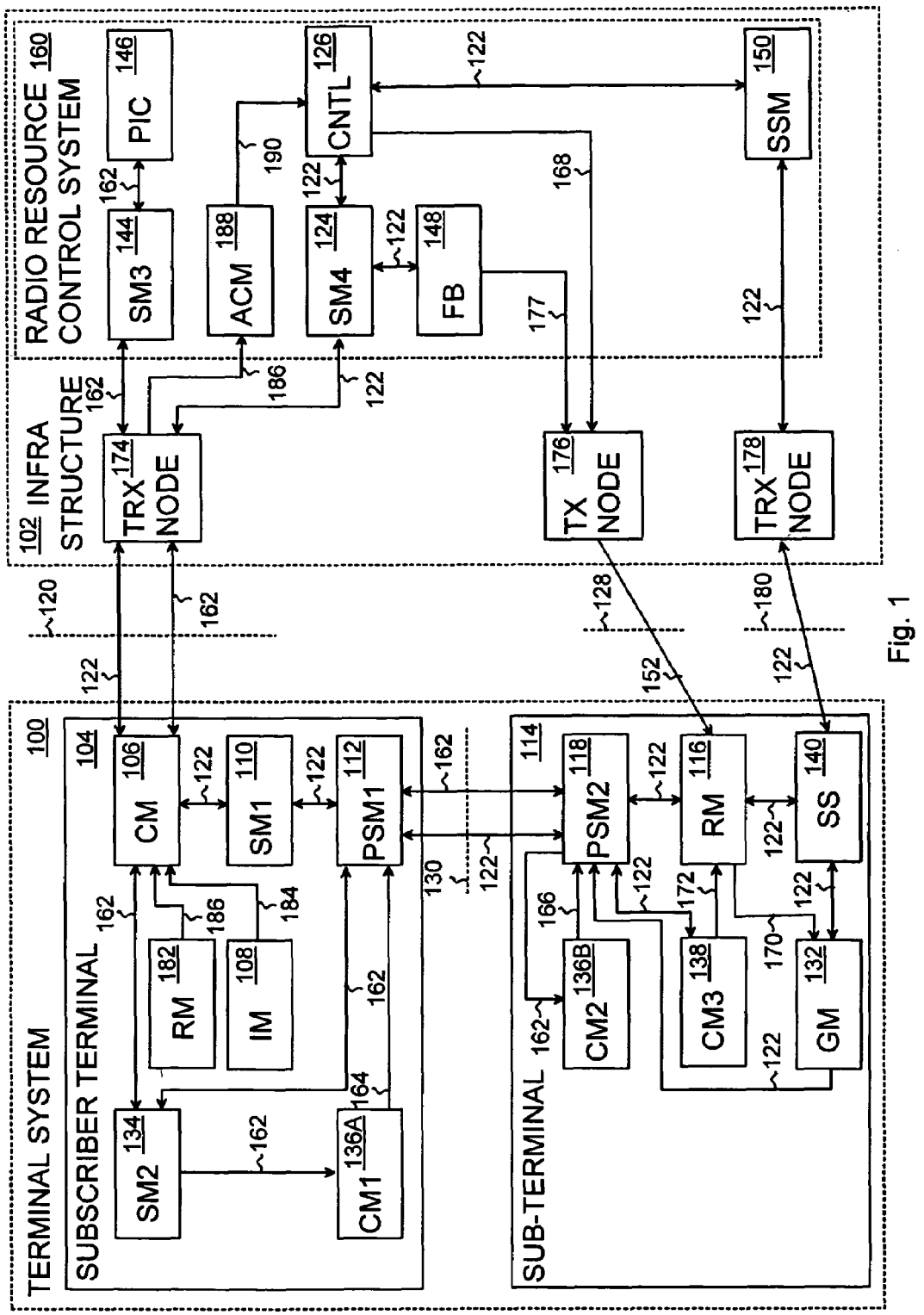

With reference to FIG. 1, a wireless telecommunications system includes a terminal system 100 and an infrastructure 102.

The terminal system 100 includes a subscriber terminal 104 and at least one sub-terminal 114, which is connectable over a proximity wireless interface 130 to the subscriber terminal 104. The proximity wireless interface 130 typically provides a local area communication link. The coverage provided by the proximity wireless interface may vary from centimeters to dozens of meters, for example. The invention is not, however, restricted to the given figures.

The sub-terminal 114 typically extends the capabilities of the subscriber terminal 104. Such extended capabilities may be, for example, an advanced display, high-data rate capacity, advanced audio properties, large data storage capacity, or advanced user ergonomics. The sub-terminal may be portable or it may be assembled in a fixed position at home or in a public place, such as an airport, for example.

The subscriber terminal 104 includes connecting means (CM) 106 for connecting the subscriber terminal 104 to the infrastructure 102 over a wireless interface 120. The connecting means 106 are responsible for radio transmission and reception between the subscriber terminal 104 and the transceiver infrastructure node 174. The connecting means 106 may include mobile equipment to carry out necessary signalling for establishing a connection between the subscriber terminal 104 and the infrastructure 102. The structure of the mobile equipment is known to one skilled in the art and only details relevant to the present solution are treated in detail.

The wireless interface 120 applies a radio frequency of the wireless telecommunications system and may be based on, for example, a TDMA (Time Division Multiple Access), FDMA (Frequency Division Multiple Access), CDMA (Code Division Multiple Access), OFDMA (Orthogonal Frequency Division Multiple Access) radio access technologies or a combination thereof. The invention is not restricted to the listed radio access technologies and their combination but may be applied to any radio access technology, as is clear to one skilled in the art.

It should be noted that the wireless telecommunications system may apply a plurality of parallel radio access technologies.

The subscriber terminal 104 further includes subscriber identity means (IM) 108 for holding the subscriber identity of the subscriber terminal 104 in the wireless telecommunications system. The subscriber identity is associated with subscriber information including an identification code, which uniquely identifies the subscriber in the wireless telecommunications system when connected to the infrastructure 102. The subscriber identity means 108 may further include security related information, such as security keys, other subscriber related information, such as billing information, and algorithms.

The subscriber terminal 104 further includes requesting means 182 connected to the connecting means 106. The requesting means 182 request a radio link 152 directed from the infrastructure 102 to the sub-terminal 114.

The subscriber terminal 104 may require, for example, extended capabilities, such as visual capabilities and the associated data transfer capacity for the purpose of video streaming, of the sub-terminal 114.

The connection between the subscriber terminal 104 and the sub-terminal 114 may be established on the basis of the radio link request. In such a case, the radio link 152 may be directed to a sub-terminal 114, which is located closest to the subscriber terminal 104.

The subscriber terminal transmits access request parameters 186 to the connection means 106, which communicate the access request parameters 186 with the transceiver node 174 of the infrastructure.

The sub-terminal 114 includes receiving means (RM) 116 for providing a radio link 152 directed from the infrastructure 102 to the sub-terminal 114. The radio link 152 is transmitted by a transmission node 176 comprised in the infrastructure 102 and received by the receiving means 116 in the sub-terminal 114. The radio link 152 applies a wireless interface 128.

The wireless interface 128 applies a radio frequency of the wireless telecommunications system and may be based on, for example, a TDMA (Time Division Multiple Access), FDMA (Frequency Division Multiple Access), CDMA (Code Division Multiple Access), OFDMA (Orthogonal Frequency Division Multiple Access) radio access technologies or a combination thereof. The invention is not restricted to the listed radio access technologies and their combination but may be applied to any radio access technology, as is clear to one skilled in the art. In an embodiment, the wireless interface 128 may be defined by a radio standard that complies with a UWB (Ultra Wide Band) spectrum usage definition.

In an embodiment of the invention, the wireless interface 128 complies with the same standard as the wireless interface 120.

The radio link 152 is controlled on the basis of signalling parameters 122 communicated between the subscriber terminal 104 and the infrastructure 102. The signalling parameters 122 provide exchange of information concerned e.g. with the establishment and control of the radio link 152.

For the ease of discussion, the signalling parameters are denoted with a single reference numeral 122 and indicated by an arrow. At a general level, the signalling parameters may be transferred in two directions. This is indicated by a two-headed arrow. A unidirectional transfer of the signalling parameters is indicated by single-headed arrows. The exact content of the signalling parameters may vary depending on their transmission direction.

The terminal system 100 further includes proximity signalling means (PSM1, PSM2) 112, 118 for communicating at least a portion of the signalling parameters 122 between the subscriber terminal 104 and the sub-terminal 114 over a proximity wireless interface 130.

The proximity signalling means include a subscriber terminal proximity signalling unit 112 and a sub-terminal proximity signalling unit 118, which may be connected over the proximity wireless interface 130 to each other.

The subscriber terminal proximity signalling unit 112 and the sub-terminal proximity signalling unit 118 provide a radio link for transferring signalling parameters 122 between the subscriber terminal proximity signalling unit 112 and the sub-terminal proximity signalling unit 118.

In an embodiment of the invention, the radio link between the two entities 112 and 118 is directed from the subscriber terminal proximity signalling unit 112 to the sub-terminal proximity signalling unit 118. In such a case, the subscriber terminal proximity signalling unit 112 includes a transmitter and the sub-terminal proximity signalling unit 118 includes a receiver.

In an embodiment of the invention, the radio link between the subscriber terminal proximity signalling unit 112 and the sub-terminal proximity signalling unit 118 is directed from the sub-terminal proximity signalling unit 118 to the subscriber terminal proximity signalling unit 112. In such a case, the subscriber terminal proximity signalling unit 112 includes a receiver and the sub-terminal proximity signalling unit 118 includes a transmitter.

In an embodiment, the proximity wireless interface 130 is a standardized interface, such as a Bluetooth, WLAN (Wireless Local Access Network) interface, RFID (Radio Frequency Identification) or a UWB interface. The standardized interfaces related radio transceivers and communication protocols are known to one skilled in the art and will be discussed in detail when relevant to the present solution.

In an embodiment of the invention, the wireless interface 120 and the proximity wireless interface 130 comply with the same standard. In such a case, the proximity wireless interface 130 may be scaled for local area communications.

In an embodiment of the invention, the wireless interface 128 and the proximity wireless interface 130 comply with the same standard. In such a case, the proximity wireless interface 130 may be scaled for local area communications. The subscriber terminal 104 further includes signalling means (SM1) 110 connected to the connecting means 106 and the subscriber terminal proximity signalling unit 112. The signalling means 110 are responsible for communicating signalling parameters 122 between the subscriber terminal 104 and the infrastructure 102 over the wireless interface 120. In transmission, the signalling means 110 are responsible, for example, for mapping the signalling parameters 122 to appropriate logical and physical channels. In reception, the signalling means 110 are responsible for extracting the signalling parameters 122 from the physical and logical channels.

When connecting to the infrastructure 102, at least a portion of the subscriber identity information 184 comprised in the subscriber identity means 108 is signalled via the connecting means 106 to the infrastructure 102. The infrastructure 102 may perform an identification procedure and authorize the use of the wireless telecommunication system according to the subscriber identity information 184. The identification procedure may include, for example, retrieving subscriber information from the home location register of the subscriber and updating the subscriber information in the local register, such as the visitor location register.

The chain composed by the connecting means 106, signalling means 110, subscriber terminal proximity signalling unit 112, and sub-terminal proximity signalling unit 118 provides a signalling route between the sub-terminal 114 and the infrastructure 102. Thus, the present solution does not require direct signalling and associated radio resources between the sub-terminal 114 and the infrastructure 102. Especially, the present solution requires no transmission capability, no device specific identification, and no radio transmitter from the sub-terminal 114.

In an aspect of the invention, the sub-terminal 114 uses the subscriber identity of the subscriber terminal 104 when connected to the infrastructure 102. As a result, the sub-terminal 114 equals the subscriber terminal 104 in terms of subscriber identity.

The terminal 1104 and the sub-terminal 114 have the same subscriber identity but a different radio identity. The subscriber identity is typically used for uniquely identifying the terminal system 100 in terms of billing and subscribed features and services. The infrastructure 102 considers the terminal system 100 as a single entity at a subscription level. This results, for example, in the termination of the radio link 152 between the sub-terminal 114 and the infrastructure if the radio connection between the subscriber terminal 104 and the infrastructure 102 is terminated.

The sub-terminal 114 may further have a terminal identity, such as IMEI (International Mobile Equipment Identity).

The terminal system 100 may be associated with a single CDR (Call Detail Record) associated with the subscriber identity of the subscriber terminal 104. The call detail record includes the necessary information about the resources and the services used by the subscriber terminal 104 and the sub-terminal 114. The call detail records are generated by network elements in the serving network and sent to the billing system of the home network of the subscriber terminal 104. The call detail record may include items such as the subscriber identity, the terminal identity of the sub-terminal 114, the identifier of the service requested for the sub-terminal 114, a resource requested for the sub-terminal 114, QoS parameters of the sub-terminal 114, and/or quantity of data transferred over the radio link 152 to the sub-terminal 114.

The subscriber identity may be associated with information on the subscribed services, e.g. services utilizing sub-terminal capabilities, such as a large display and possibly high bit transfer rates. The information associated with the subscriber identity may be stored in the subscriber identity means 108 or in an appropriate register, such as the HLR (Home Location Register) or the VLR (Visitor Location Register) of the infrastructure 102.

Different radio identities of the subscriber terminal 104 and the sub-terminal 114 results in, for example, separate link addresses, separate link scheduling and separate radio resource management.

In an aspect of the invention, the infrastructure 102 includes a radio resource control system 160, which comprises access control means 188 for controlling the access of the sub-terminal 114 to the infrastructure on the basis of an access request from the subscriber terminal 104, controlling means (CNTL) 126 for controlling the radio link 152, and signalling means (SM4) 124 for communicating at least some of the signalling parameters 122 between the infrastructure 102 and the subscriber terminal 104.

The access control means 188 are connected to the transceiver node 174 and receive the access request parameters 186 from the transceiver node 174. The access control means 188 carry out an access control procedure based on the access request parameters. The access control procedure includes, for example, establishment of a radio identity for the sub-terminal 114 so that radio resources may be allocated separately to the sub-terminal 114 and the subscriber terminal 104, and association of the sub-terminal 114 to the call detail record of the subscriber terminal 104. The access control means 188 may, for example, pass access control information 190 to the controlling means 126. The access control information 190 may include the radio identity.

The controlling means 126 are responsible for generating at least some of the signalling parameters which are used in controlling the radio link 152. The control of the radio link 152 may include tasks such as admission control, allocation of radio resources, such as power resources, code resources, frequency resources, time slot resources, and antenna resources. The signalling parameters 122 may contain information on the allocation of the resources. In one aspect, the signalling parameters may contain information on the availability of resources.

In an embodiment of the invention, at least some of the signalling parameters 122 are transferred from the sub-terminal 114 to the controlling means 126 of the infrastructure 102. In such a case, the signalling parameters 122 may include, for example, system information on the sub-terminal 114, information on the quality of the radio link 152, confirmation parameters to confirm correct transmission of signalling parameters, and a request for handover. The system information on the sub-terminal 114 may include, for example, capability information, which defines the services and resources being offered to the particular sub-terminal 114. The system information may further include quality of service (QoS) information in order to inform the infrastructure to allocate a sufficient amount of radio resources to the sub-terminal.

When communicating the signalling parameters 122 from the sub-terminal 114 to the infrastructure 102, the signalling parameters 122 are first transferred to the sub-terminal proximity signalling unit 118. The signalling parameters 122 are communicated from the sub-terminal proximity signalling unit 118 to the subscriber terminal proximity signalling unit 112 over the proximity wireless interface 130. The subscriber terminal proximity signalling unit 112 delivers the signalling parameters 122 to the signalling means (SM1) 110 of the subscriber terminal 104 which, for example, maps the signalling parameters 122 to appropriate logical and physical channels. The signalling means 110 deliver the signalling parameters 122 to the connection means 106, which transmit the signalling parameters 122 over the wireless interface 120 to the transceiver node 174. The transceiver node 174 receives the signalling parameters 122 and passes the signalling parameters 122 to the signalling means (SM4) 124 of the infrastructure 102. The signalling means 124 extract the signalling parameters 122 from the physical and logical channels and deliver the signalling parameters 122 to the controlling means 126.

The controlling means 126 may, for example, generate signalling parameters 122 to be transmitted in the downlink direction and/or control parameters 168 to be sent to the transceiver node 176.

In an embodiment of the invention, the sub-terminal 114 includes generating means (GM) 132 connected to the sub-terminal proximity signalling unit 118, for generating at least one of the signalling parameters 122. The generating means 132 may include, for example, a channel estimator connected to the receiving means 116. The channel estimator may receive, for example, a base band signal 170 from the receiving means 116, which base band signal 170 is used for characterizing the radio link 152. The channel estimator may generate a channel quality parameter, such as SIR (Signal-to-Interference Ratio) or BER (Bit Error Rate), which characterizes the quality of the radio link 152. The result of the characterization, i.e. a channel quality paramete,r is included in the signalling parameters 122 and delivered to the infrastructure 102.

The infrastructure 102 may include feedback controlling means 148 for controlling the radio link 152 on the basis of the signalling parameters 122. The feedback controlling means are connected to the signalling means 124 of the infrastructure 102, which signalling means 124 receive the signalling parameters 122 generated in the generating means 132. The feedback controlling means 148 may generate control parameters 177 for the transceiver node 176. The control parameters 177 may include, for example, transmit power control parameters, source coding adjusting parameters, channel coding adjusting parameters, link scheduling parameters, load and admission control parameters, channel bandwidth parameters, or transmit antenna weights.

In an embodiment of the invention, at least one of the signalling parameters 122 is generated in the controlling means 126. The controlling means 126 deliver the signalling parameters 122 to the signalling means 124, which map the signalling parameters 122 to appropriate logical and control channels. The signalling parameters 122 are delivered to the transceiver node 174, which transmits the signalling parameters 122 to the connecting means 106 of the subscriber terminal 104 over the wireless interface 120. The connecting means 106 deliver the signalling parameters 122 to the signalling means 110 of the subscriber terminal 104, which extracts the signalling parameters 122 from the logical and physical channels. The signalling parameters 122 are delivered from the signalling means 110 to the subscriber terminal proximity signalling unit 112, which transfers the signalling parameters 122 to the sub-terminal proximity signalling unit 118 over the proximity wireless interface 130. The sub-terminal proximity signalling unit 118 delivers the signalling parameters 122 to the receiving means 116. In such a case, the signalling parameters 122 may include information requests, such as capability enquiries.

In an embodiment of the invention, the sub-terminal 114 includes configuring means (CM3) 138 connected to the receiving means 116 and the sub-terminal proximity signalling unit 118, for configuring the receiving means 116 according to at least one of the signalling parameters 122. The configuring means 138 receive the signalling parameters 122 from the sub-terminal proximity signalling unit 118 and generates a configuring command 172 for the receiving means 116. The signalling parameters 112 may result in configuring commands 172, such as change in the dispreading code, change in the receive frequency, and/or change in the data transfer rate.

In an embodiment of the invention, the subscriber terminal 104 includes second signalling means (SM2) 134 connected to the connecting means 106 and the subscriber terminal proximity signalling unit 112, for communicating proximity signalling parameters 162 between the subscriber terminal 104 and the infrastructure 102. The second signalling means 134 are connected to proximity interface configuring means (CM1, CM2) 136A, 136B for configuring the proximity signalling means 112, 118 according to the proximity signalling parameters 162.

The proximity configuring means 136A, 136B may include a subscriber terminal configuring unit (CM1) 136A responsible of configuring the subscriber terminal proximity signalling unit 112. The subscriber terminal configuring unit 136A generates a configuration command 164, and delivers the configuration command 166 to the subscriber terminal proximity signalling unit 112.

The proximity configuring means 136, 138 may include a sub-terminal configuring unit (CM2) 136B responsible for configuring the sub-terminal proximity signalling unit 118. The sub-terminal configuring unit 136B generates a configuration command 166, and delivers the configuration command 166 to the subscriber terminal proximity signalling unit 118.

The configuration command 164, 166 follows the instructions carried by the proximity signalling parameters 162. The instructions may include information on the desired transmission power, coding, and communication frequency.

The infrastructure 102 may include proximity wireless interface controlling means (PIC) 146 for controlling the proximity wireless interface 130 on the basis of proximity signalling parameters 162.

The infrastructure 102 may further include second signalling means 144 for communicating the proximity signalling parameters 162 with the subscriber terminal 104.

The proximity signalling parameters 162 are communicated via the connection means 106 of the subscriber terminal 104 and the transceiver node 174 of the infrastructure 102.

The proximity wireless interface controlling means 146 may generate the signalling parameters 162 based on, for example, a signalling requirement. Such a requirement may be, for example, data transfer rate, bandwidth, transmit power, or security.

In an embodiment of the invention, the proximity signalling parameters 162 allocate radio resources, such as time periods or spreading codes to the proximity wireless interface 130 so that other communication links, such as the links over the wireless interfaces 120, 128, or 180 may be separated from the radio link provided by the proximity wireless interface 130. This may be required, for example, when the proximity wireless interface 130 complies with the same standard as the wireless interfaces 120, 128, and/or 180 and/or if the wireless interfaces 120, 128, and/or 180 interfere with the proximity wireless interface 130.

The second signalling means 134 may perform tasks such as extracting the proximity signalling parameters 162 from logical and physical channels of the wireless telecommunications system.

In an embodiment of the invention, the sub-terminal 114 includes sub-terminal signalling means 140 connected to the receiving means 116, for communicating signalling parameters 122 between the sub-terminal 114 and the infrastructure 102 over a wireless interface 180.

In an embodiment of the invention, the radio resource control system 160 includes sub-terminal signalling means 150 connected to the controlling means 126, for communicating signalling parameters 122 to the sub-terminal 114 over a wireless interface 180.

The sub-terminal signalling means 140 of the sub-terminal 114, the transceiver node 178 and the sub-terminal signalling means 150 of the infrastructure 102 provide a direct signalling route between the sub-terminal 114 and the infrastructure 102 over the wireless interface 180.

In an embodiment of the invention, the sub-terminal signalling means 140 of the sub-terminal 114, the transceiver node 178 and the sub-terminal signalling means 150 of the infrastructure 102 operate in the downlink transmission direction. In such a case, the sub-terminal signalling means 140 include a radio receiver for providing the wireless interface 180. The radio receiver may be integrated in the receiving means 116.

In an embodiment of the invention, the sub-terminal signalling means 140 of the sub-terminal 114, the transceiver node 178 and the sub-terminal signalling means 150 of the infrastructure 102 operate in the uplink transmission direction. In such a case, the sub-terminal signalling means 140 include a radio transmitter for providing the wireless interface 180.

Let us consider an embodiment where some of the signalling parameters 122 between the sub-terminal 114 and the infrastructure 102 are communicated via the subscriber terminal 104 over the wireless interface 120 and some are communicated directly between the sub-terminal 114 and the infrastructure over the wireless interface 180.

In an embodiment of the invention, the subscriber identity related signalling parameters are communicated over the wireless interface 120. Such signalling parameters may include, for example, a code to identify the sub-terminal 114 in the infrastructure 102. In such a case, the proximity wireless interface 130 may provide a security link in order to secure the communication of the code between the sub-terminal 114 and the subscriber terminal 104. After communicating the subscriber identity related signalling parameters, the wireless interface 180 may be activated for communicating signalling parameters required for maintaining the radio link 152.

Figure 2:
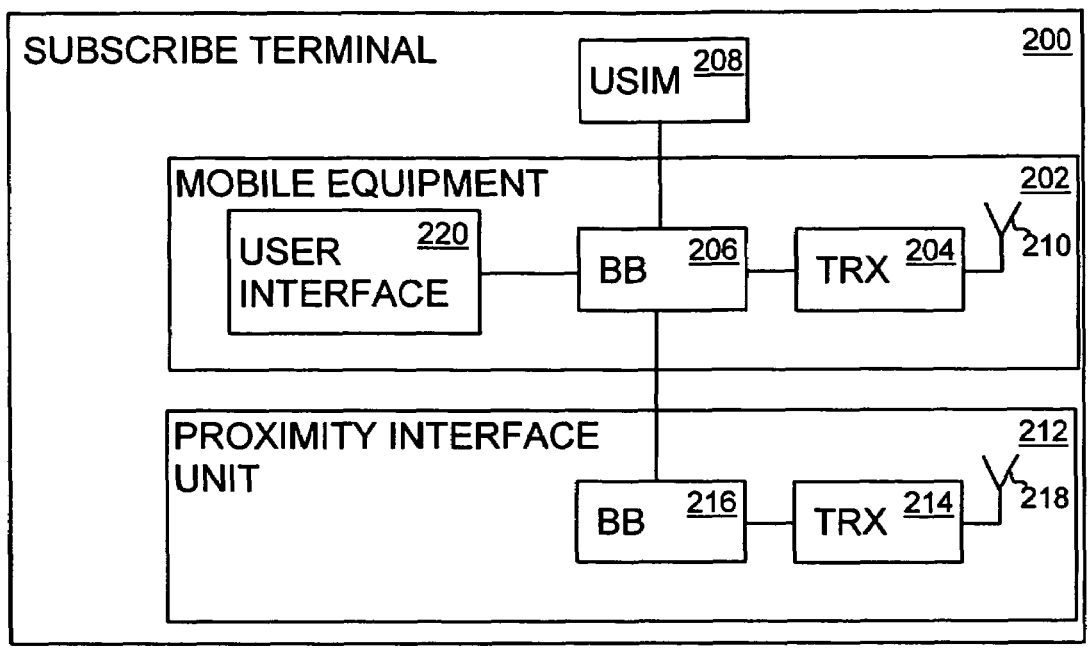
FIG. 2 shows an example of the structure of a subscriber terminal according to embodiments of the invention.

With reference to FIG. 2, a subscriber terminal 200 may include mobile equipment 202, an UMTS (Universal Mobile Telecommunications System) subscriber identity module 208 connected to the mobile equipment 202, and a proximity interface unit 212 connected to the mobile equipment 202.

The mobile equipment 202 may include a radio transceiver 204, a base band unit 206 connected to the radio transceiver 204, an antenna 210 connected to the radio transceiver 204, and a user interface connected to the base band unit 206.

The radio transceiver 204 provides a bi-directional wireless interface 120 between the subscriber terminal 200 and the infrastructure, thus providing at least a part of the connecting means 106 shown in FIG. 1.

The base band unit 206 includes a digital signal processor, memory and software, and performs digital signal processing. The base band unit 206 may perform tasks of the requesting means, connecting means 106, signalling means 110, and the second signalling means 134. The signalling means 110 and the second signalling means 134 may be implemented with software applications.

The UMTS subscriber identity module (USIM) 208 presents an example of the subscriber identity means 108. The UMTS subscriber identity module 204 is a smart card that holds the subscriber identity, performs authentication algorithms, stores authentication and encryption keys and subscriber information.

The user interface 220 may include a keyboard, a display, a microphone and a loudspeaker.

With further reference to FIG. 2, a proximity interface unit 212 provides the proximity wireless interface 130 shown in FIG. 1. The proximity interface unit 212 may include a radio transceiver 214, an antenna 218 connected to the radio transceiver 214, and a base band unit 216 connected to the radio transceiver 214.

The base band unit 216 includes a digital signal processor, memory and software, and performs digital signal processing. The base band unit 216 may perform tasks of the subscriber terminal proximity signalling unit 112 and the subscriber terminal configuring unit 136A. The tasks of the subscriber terminal proximity signalling unit 112 and the subscriber terminal configuring unit 136A may be implemented with software applications.

The mobile equipment 202 and the proximity interface unit 212 may be connected in the digital domain by coupling the base band unit 206 of the mobile equipment 202 with the base band unit 216 of the proximity interface unit 212. The signalling parameters 122 and the proximity signalling parameters 162 may be transferred between the two base band units 206 and 216.

Figure 3:
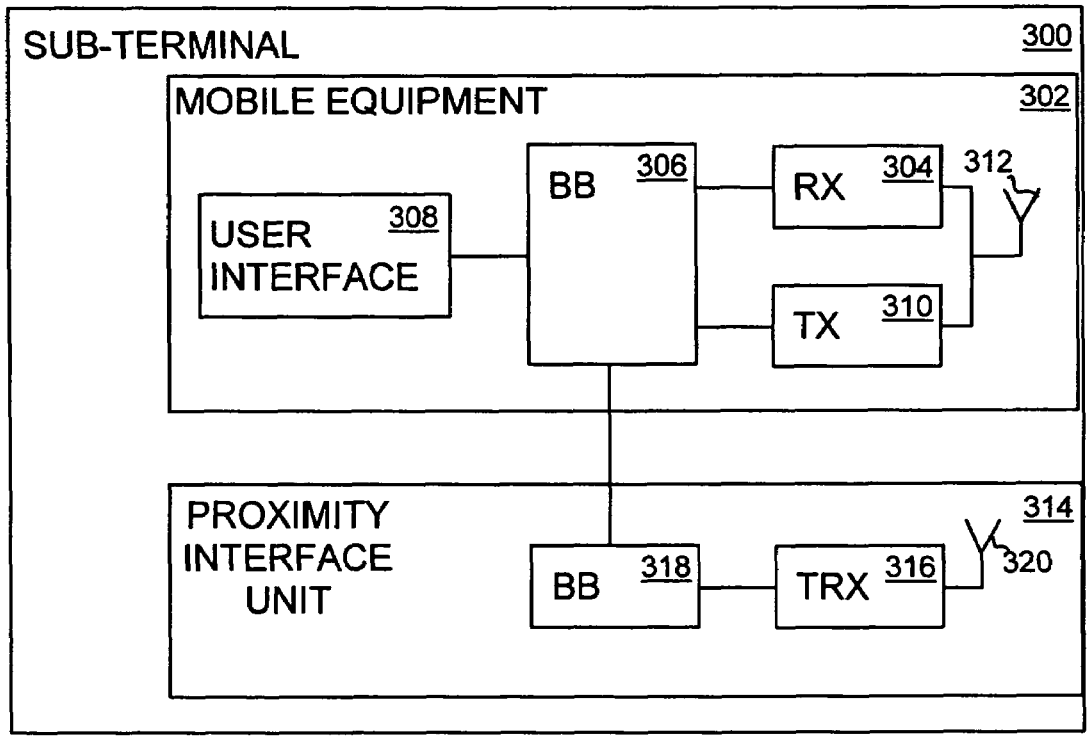
FIG. 3 shows an example of the structure of a sub-terminal according to embodiments of the invention.

With reference to FIG. 3, a sub-terminal 300 may include mobile equipment 302, and a proximity interface unit 314 connected to the mobile equipment 302.

The proximity interface unit 314 includes an antenna 320, a transceiver 316, and a base band unit 318. Their structure and operation are similar to those of counterparts in the subscriber terminal 200 and are not described in detail. The proximity interface unit 314 provides the proximity wireless interface 130.

The transceiver 316, antenna 320 and the base band unit 318 may perform tasks of the sub-terminal proximity signalling unit 118. The base band unit 318 may perform tasks of the sub-terminal configuring unit (CM2) 136B.

The mobile equipment 302 includes an antenna 312, receiver 304, base band unit 306, and a user interface 308.

The antenna 312, receiver 304, and base band unit 306 may perform tasks of the receiving means 116. The base band unit 306 may perform the tasks of the configuring means 138, generating means 132, and sub-terminal signalling means 140. The aforementioned tasks in the base band unit 306 may be implemented with a digital signal processor, memory and software.

A radio signal transferred by the radio link 152 is received by the receiver 304 and processed in the base band unit 306. The radio signal may include, for example, an audio and/or video signal, which is delivered to the user interface 308. The user interface 308 may include a large screen, which extends the relatively small display of the subscriber terminal 200 in a desired manner.

In an embodiment, the mobile equipment 302 includes a transmitter 310 connected to the base band unit 306. The transmitter 310 may perform tasks of the sub-terminal signalling means 140, when operating in the uplink.

Figure 4:
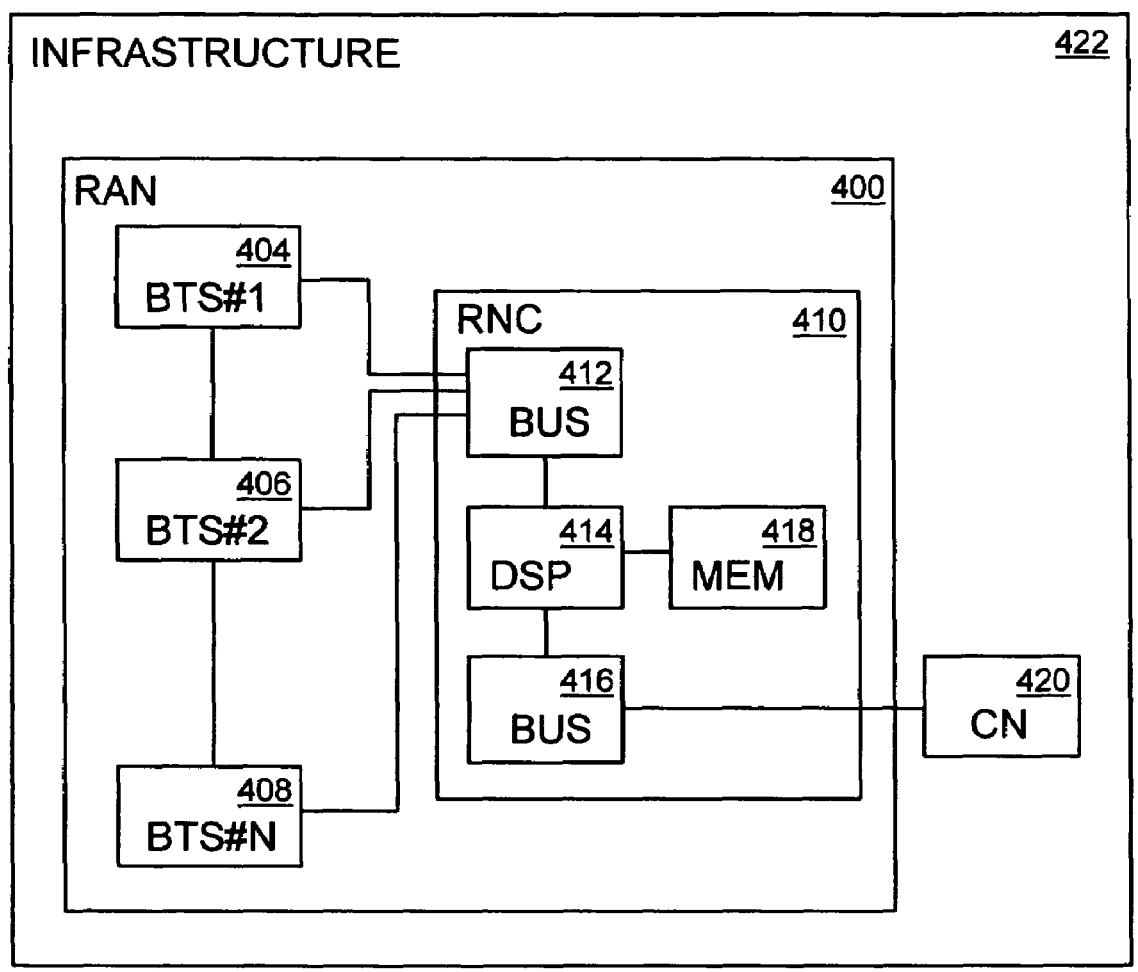
FIG. 4 shows an example of the structure of a radio resource control system according to embodiments of the invention.

With reference to FIG. 4, an infrastructure 422 includes a radio access network and a core network 420.

The radio access network 400 includes a plurality of base stations (BTS#1, BTS#2, BTS#N) 404, 406, 408, and a radio network controller (RNC) 410 connected to the base stations 404, 406, 408. The base station 404, 406, 408 is a network element responsible for radio transmission and reception between the infrastructure 422 and terminals. The base station 404, 406, 408 represents the nodes 174, 176, 178 shown in FIG. 1. The base station may be Node B, for example.

The radio network controller 410 may include a digital signal processor 414 and memory 418 connected to the digital signal processor 414.

The elements 124, 126, 144, 146, 148, 150, and 188 in the radio resource control system 160 shown in FIG. 1 may be implemented with the digital signal processor 414, memory 418, and software.

The access control means 188 may also be implemented in the network elements of the core network 420 by using a computer and software. Such network elements may include be the mobile switching center, for example.

The radio network controller 410 may further include a bus unit 412 between the base stations 404, 406, 408 and the digital signal processor 414.

The radio network controller 410 may further include a second bus unit 416 between the core network 420 and the digital signal processor 414.

Figure 5:
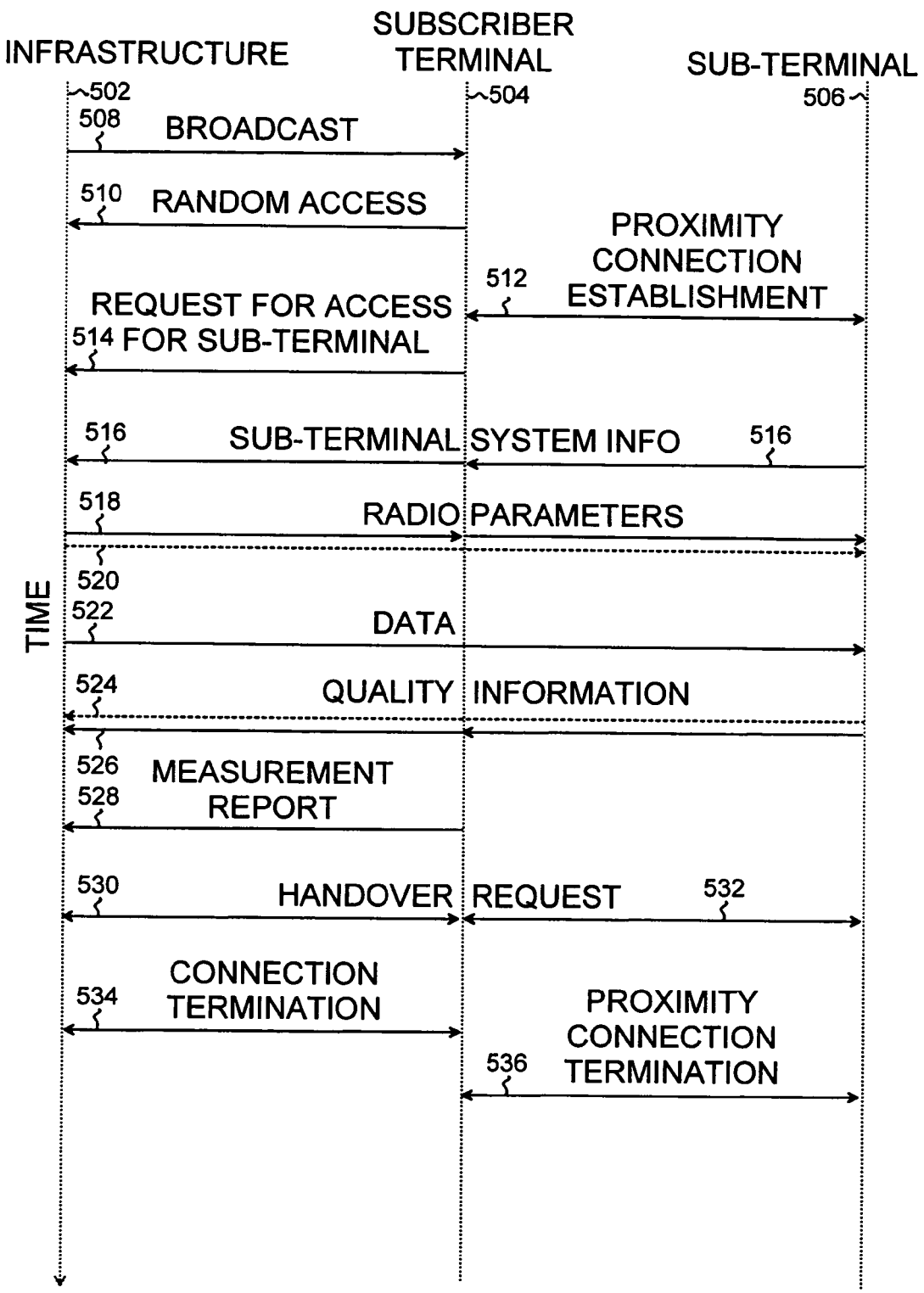
FIG. 5 shows an example of a signalling scheme according to embodiments of the invention.

With reference to FIG. 5, embodiments of a signalling scheme between an infrastructure 502, a subscriber terminal 504 and a sub-terminal 506 are illustrated. The time axis goes from the top to the bottom.

The infrastructure 502 typically performs broadcast signalling 508 for delivering general information, such as random access codes, access slots in the cell and types of transmit diversity methods, from the infrastructure 502 to the subscriber terminal 504. The broadcast signalling may utilize broadcast channels.

The subscriber terminal 504 may perform random access signalling 510 to the infrastructure 502 in order to carry control information, such as a connection set-up request, in order to establish a connection with the infrastructure 502.

The broadcast signalling 508 and the random access signalling 510 are typically intended for executing connection establishment procedures between the infrastructure 502 and the subscriber terminal 504.

The subscriber terminal 504 and the sub-terminal 506 perform proximity connection establishment signalling 512 for exchanging relevant information, such as system information and radio parameters, in order to establish the proximity connection.

The subscriber terminal 504 may perform access request signalling 514 to the infrastructure 502 in order to request the radio link 512 directed from the infrastructure 502 to the sub-terminal 506.

In order to be able to control the radio link 152, system information 516 on the sub-terminal 506 may be delivered from the sub-terminal 506 to the infrastructure 502. The system information 512 may be first communicated from the sub-terminal 506 to the subscriber terminal 504 over the proximity wireless interface 130, and second, from the subscriber terminal 504 to the infrastructure 502 over the wireless interface 120.

Radio parameters 518, such as those associated with coding and modulation, may be first delivered from the infrastructure 502 to the subscriber terminal 504 over the wireless interface 120 and second, from the subscriber terminal 504 to the sub-terminal 506 over the over the proximity wireless interface 130. In an embodiment of the invention, some of the radio parameters 520, indicated by a dashed line, are transmitted from the infrastructure 502 to the sub-terminal 506 over the wireless interface 180.

After the radio link 152 has been established, data 522 may be communicated directly from the infrastructure 502 to the sub-terminal 506.

The sub-terminal 506 may generate quality information 524, 526 on the radio link 152. A portion 524 of the quality information may be communicated from the sub-terminal 506 to the infrastructure 502 over the wireless interface 180. A portion 526 of the quality information may be communicated from the sub-terminal 506 to the infrastructure 502 via the subscriber terminal 504.

The subscriber terminal 504 may perform measurements on signals transmitted over the wireless interface 120. Measurement reports 528 may be transmitted from the subscriber terminal 504 to the infrastructure 502.

The measurement reports 528 may give rise to handover requests 530 to the subscriber terminal 504. A handover request 532 to the sub-terminal 506 may be generated in the subscriber terminal 504 in order to perform simultaneous handovers of the subscriber terminal 504 and the sub-terminal 506.

A connection termination message 534 for terminating the connection between the infrastructure 502 and the sub-terminal 504 may be generated in the infrastructure 502 and transmitted to the subscriber terminal 504. The connection termination message 534 may activate the subscriber terminal 504 to transmit a proximity connection termination message 536 to the sub-terminal 506 by means of the proximity signalling.

Figure 6:
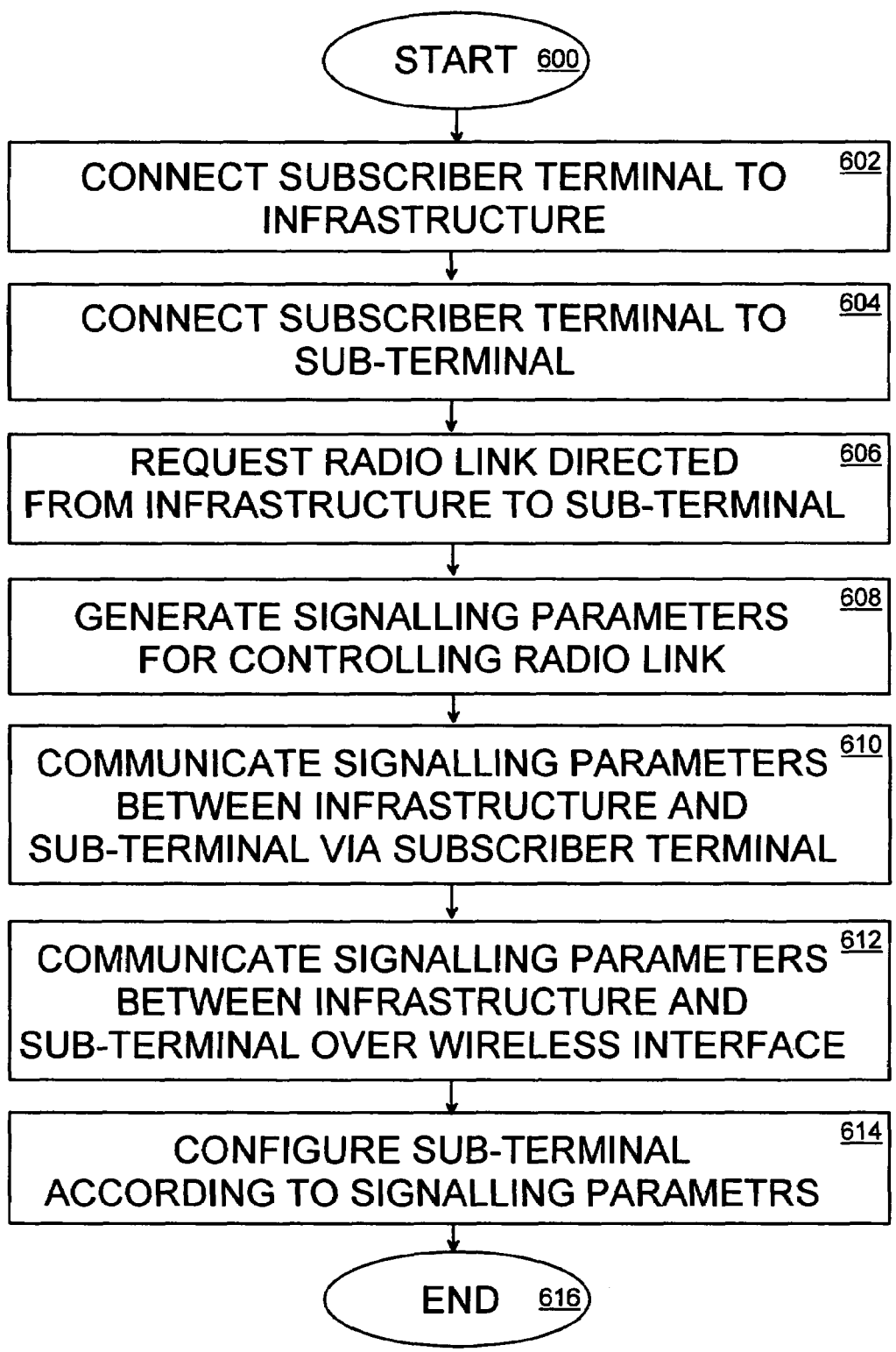
FIG. 6 shows an example of a methodology according to embodiments of the invention.

With reference to FIG. 6, the methodology according to embodiments of the invention is illustrated.

In 600, the method starts.

In 602, the subscriber terminal 104 is connected to the infrastructure 102 over a wireless interface 120, the subscriber terminal 104 holding a subscriber identity in the wireless telecommunications system.

In 604, the subscriber terminal 104 is connected to at least one sub-terminal 114 over a proximity wireless interface 130, the at least one sub-terminal 114 using the subscriber identity of the subscriber terminal 104.

In 606, a radio link 152 is requested from the subscriber terminal 104, the radio link 152 being directed from the infrastructure 102 to the at least one sub-terminal 114.

In 608, signalling parameters 122 are generated for controlling the radio link 152. In an embodiment, at least some of the signalling parameters are generated in the sub-terminal 114.

In 610, at least one of the signalling parameters 122 is communicated between the sub-terminal 114 and the infrastructure 102 via the subscriber terminal 104.

In 612, at least some of the signalling parameters 122 are communicated between the sub-terminal 114 and the infrastructure 102 over a wireless interface between the infrastructure 102 and the sub-terminal 144.

In 614, the sub-terminal 114 is configured to provide the radio link 152 according to at least some of the signalling parameters 122.

In 616, the method ends.

Figure 7:
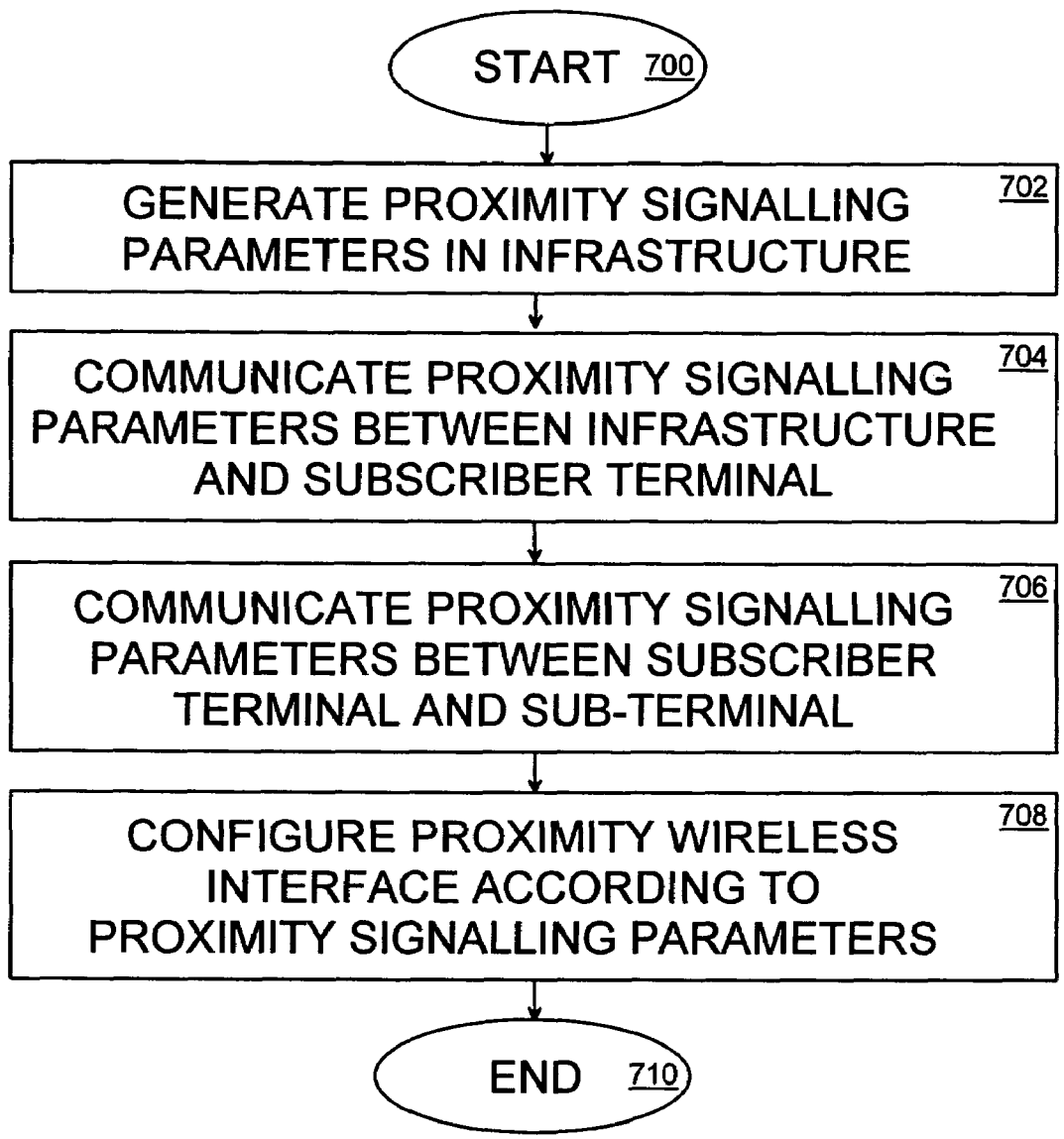
FIG. 7 shows a second example of a methodology according to embodiments of the invention.

With reference to FIG. 7, the methodology according to embodiments of the invention is further illustrated.

In 700, the method starts.

In 702, proximity signalling parameters 162 are generated in the infrastructure 102, for controlling the proximity wireless interface 130.

In 704, the proximity signalling parameters 162 are communicated between the subscriber terminal 104 and the infrastructure 102.

In 706, at least some of the proximity signalling parameters 162 are communicated between the subscriber terminal 104 and the sub-terminal 144.

In 708, the proximity wireless interface 130 is configured according to the proximity signalling parameters 162.

In 710, the method ends.

Even though the invention has been described above with reference to an example according to the accompanying drawings, it is clear that the invention is not restricted thereto but it can be modified in several ways within the scope of the appended claims.

The invention claimed is:

1. A method comprising:
   connecting a subscriber terminal of a wireless telecommunications system to an infrastructure of the wireless telecommunications system over a wireless interface, the subscriber terminal holding a subscriber identity in the wireless telecommunications system;
   connecting the subscriber terminal to at least one sub-terminal over a proximity wireless interface, the at least one sub-terminal using the subscriber identity of the subscriber terminal;
   requesting a radio link from the subscriber terminal, the radio link being directed from the infrastructure to the at least one sub-terminal;
   generating signaling parameters for controlling the radio link; and
   communicating at least one of the signaling parameters between the at least one sub-terminal and the infrastructure, and
   the subscriber terminal and the at least one sub-terminal being in connection with the infrastructure simultaneously.

2. The method of claim 1, further comprising generating at least one of the signaling parameters in the at least one sub-terminal.

3. The method of claim 1, further comprising communicating at least one of the signaling parameters between the at least one sub-terminal and the infrastructure over a wireless interface between the infrastructure and the at least one sub-terminal.

4. The method of claim 1, further comprising configuring the at least one sub-terminal to provide the radio link according to at least one of the signaling parameters.

5. The method of claim 1, further comprising:
   generating, in the infrastructure, proximity signaling parameters for controlling the proximity wireless interface;
   communicating the proximity signaling parameters between the subscriber terminal and the infrastructure;
   communicating at least one of the proximity signaling parameters between the subscriber terminal and the at least one sub-terminal; and
   configuring the proximity wireless interface according to the proximity signaling parameters.

6. The method of claim 1, further comprising generating a handover request to the at least one sub-terminal in the subscriber terminal in order to perform simultaneous handovers of the subscriber terminal and the at least one sub-terminal.

7. The method of claim 1, wherein the control of the radio link is admission control, or allocation of radio resources.

8. A system comprising:
   a subscriber terminal and at least one sub-terminal, wherein the subscriber terminal comprises a connecting unit configured to connect the subscriber terminal to a infrastructure of a wireless telecommunications system and a subscriber identity unit configured to hold a subscriber identity of the subscriber terminal in the wireless telecommunications system,
   wherein the at least one sub-terminal uses the subscriber identity of the subscriber terminal and comprises a receiving unit configured to provide a radio link directed from the infrastructure to the at least one sub-terminal, the radio link being controlled on the basis of signaling parameters,
   wherein the subscriber terminal comprises a requesting unit operationally connected to the connecting unit, configured to request the radio link,
   wherein the system comprises a signaling unit operationally connected to the connecting unit, configured to communicate at least one of the signaling parameters between the subscriber terminal and the infrastructure, wherein the system comprises a proximity signaling unit operationally connected to the signaling unit, configured to communicate the at least one of the signaling parameters between the subscriber terminal and the at least one sub-terminal over a proximity wireless interface, and wherein the subscriber terminal and the at least one sub-terminal are connected to the infrastructure simultaneously.

9. An apparatus, comprising:

a connecting unit configured to connect the apparatus to an infrastructure of a wireless telecommunications system;

a subscriber identity unit configured to hold a subscriber identity of the apparatus in the wireless telecommunications system;

a requesting unit operationally connected to the connecting unit, configured to request a radio link directed from the infrastructure to at least one sub-terminal, the at least one sub-terminal using the subscriber identity of the apparatus, the radio link being controlled on the basis of signaling parameters;

a proximity signaling unit configured to communicate at least one of the signaling parameters with the at least one sub-terminal over a proximity wireless interface;

a signaling unit operationally connected to the connecting unit and the proximity signaling unit, configured to communicate the at least one of the signaling parameters between the apparatus and the infrastructure, wherein the apparatus is configured to be in connection with the infrastructure simultaneously with the at least one sub-terminal.

10. The apparatus of claim 9, further comprising:

a second signaling unit configured to communicate proximity signaling parameters between the apparatus and the infrastructure; and a proximity interface configuring unit operationally connected to the proximity signaling unit and the second signaling unit, configured to configure the proximity signaling unit according to at least one of the proximity signaling parameters.

11. The apparatus of claim 9, further comprising a handover request unit configured to generate a handover request to the at least one sub-terminal in order to perform simultaneous handovers of the apparatus and the at least one sub-terminal.

12. The apparatus of claim 9, wherein the control of the radio link is admission control, or allocation of radio resources.

13. An apparatus, comprising:

a receiving unit configured to provide a radio link directed from an infrastructure of a wireless telecommunication system, to the apparatus, the apparatus being operationally connected to the infrastructure and holding a subscriber identity in the wireless telecommunications system, the apparatus using the subscriber identity of a subscriber terminal and, the radio link being controlled on the basis of signaling parameters communicated between the subscriber terminal and the infrastructure, the radio link being requested by the subscriber terminal;

a proximity signaling unit configured to communicate at least one of the signaling parameters between the subscriber terminal and the apparatus over a proximity wireless interface, and wherein the apparatus is configured to be in connection with the infrastructure simultaneously with the subscriber terminal.

14. The apparatus of claim 13, further comprising a generating unit operationally connected to the proximity signaling unit, configured to generate at least one of the signaling parameters.

15. The apparatus of claim 13, further comprising a sub-terminal signaling unit operationally connected to the receiving unit, configured to communicate at least one of the signaling parameters between the apparatus and the infrastructure over a wireless interface.

16. The apparatus of claim 13, further comprising a receiver configuring unit operationally connected to the receiving unit and the proximity signaling unit, configured to configure the receiving unit according to at least one of the signaling parameters.

17. The apparatus of claim 13, further comprising a proximity interface configuring unit operationally connected to the proximity signaling unit, configured to configure the proximity signaling unit according to at least one of the proximity signaling parameters received from the subscriber terminal.

18. The apparatus of claim 13, wherein the control of the radio link is admission control, or allocation of radio resources.

19. An apparatus, comprising:

an access control unit configured to control access of at least one sub-terminal to an infrastructure of a wireless telecommunications system on the basis of an access request from a subscriber terminal of the wireless telecommunications system, the subscriber terminal being operationally connected to the infrastructure and the access of the at least one sub-terminal being simultaneous with the connection of the subscriber terminal and the subscriber terminal holding the subscriber identity in the wireless telecommunications system, the at least one sub-terminal using the subscriber identity of the subscriber terminal;

a controlling unit operationally connected to the access control unit, configured to control a radio link directed from the infrastructure to the at least one sub-terminal, the radio link being controlled on the basis of signaling parameters; and a signaling unit configured to communicate at least one of the signaling parameters between the infrastructure and the subscriber terminal, the at least one of the signaling parameters being communicated between the subscriber terminal and the at least one sub-terminal over a proximity wireless interface.

20. The apparatus of claim 19, further comprising a sub-terminal feedback controlling unit operationally connected to the signaling unit, configured to control the radio link on the basis of the signaling parameters generated in the at least one sub-terminal.

21. The apparatus of claim 19, further comprising a sub-terminal signaling unit operationally connected to the controlling unit, configured to communicate signaling parameters with the at least one sub-terminal over a wireless interface.

22. The apparatus of claim 19, further comprising:

a proximity wireless interface controlling unit configured to control the proximity wireless interface on the basis of proximity signaling parameters; and a second signaling unit configured to communicate at least one of the proximity signaling parameters with the sub-scriber terminal.

23. The apparatus of claim 19, wherein the control of the radio link is admission control, or allocation of radio resources.

24. An apparatus, comprising:
- connecting means for connecting the apparatus to an infrastructure of a wireless telecommunications system;
- subscriber identity means for holding a subscriber identity of the apparatus in the wireless telecommunications system;
- requesting means for requesting a radio link directed from the infrastructure to at least one sub-terminal, the at least one sub-terminal using the subscriber identity of the apparatus, the radio link being controlled on the basis of signaling parameters;
- proximity signaling means for communicating at least one of the signaling parameters with the at least one sub-terminal over a proximity wireless interface;
- signaling means for communicating the at least one of the signaling parameters between the apparatus and the infrastructure,
- wherein the apparatus is configured to be in connection with the infrastructure simultaneously with the at least one sub-terminal.

25. An apparatus, comprising:
- receiving means for providing a radio link directed from an infrastructure of a wireless telecommunication system, to the apparatus, the apparatus being operationally connected to the infrastructure and holding a subscriber identity in the wireless telecommunications system, the apparatus using the subscriber identity of a subscriber terminal and, the radio link being controlled on the basis of signaling parameters communicated between the subscriber terminal and the infrastructure, the radio link being requested by the subscriber terminal; and
- proximity signaling means for communicating at least one of the signaling parameters between the subscriber terminal and the apparatus over a proximity wireless interface,
- wherein the apparatus is configured to be in connection with the infrastructure simultaneously with the subscriber terminal.

26. An apparatus, comprising:
- access control means for controlling access of at least one sub-terminal to an infrastructure of a wireless telecommunications system on the basis of an access request from a subscriber terminal of the wireless telecommunications system, the subscriber terminal being operationally connected to the infrastructure and the access of the at least one sub-terminal being simultaneous with the connection of the subscriber terminal and the subscriber terminal holding the subscriber identity in the wireless telecommunications system, the at least one sub-terminal using the subscriber identity of the subscriber terminal;
- controlling means for controlling a radio link directed from the infrastructure to the at least one sub-terminal, the radio link being controlled on the basis of signaling parameters; and
- signaling means for communicating at least one of the signaling parameters between the infrastructure and the subscriber terminal, the at least one of the signaling parameters being communicated between the subscriber terminal and the at least one sub-terminal over a proximity wireless interface.

* * * * *